UNITED STATES PATENT OFFICE.

JAMES B. FORSYTH, OF BOSTON, MASSACHUSETTS, ASSIGNOR TO HIMSELF AND JOHN H. CHEEVER, OF NEW YORK, N. Y.

IMPROVEMENT IN LINING HOSE AND TUBES WITH INDIA-RUBBER.

Specification forming part of Letters Patent No. 79,220, dated June 23, 1868; Reissue No. 7,887, dated September 18, 1877; application filed July 21, 1877.

*To all whom it may concern:*

Be it known that I, JAMES B. FORSYTH, of Boston, in the county of Suffolk and State of Massachusetts, have invented certain new and useful Improvements in Lining Flexible and other Tubes, Hose, &c., with India-Rubber or equivalent material; and I hereby declare the following to be a full, clear, and exact description of the same.

My invention has relation to the method of lining hose or tubes with india-rubber. Many methods of lining such objects with india-rubber have been essayed, but with little success, and it is only with considerable labor and expense, and with no certainty of obtaining a perfect article, that a tube can be thus lined by any mode now in use.

The object of my invention is to obviate these difficulties and to produce a cheap, quick, and simple process of lining such articles; and to this end it may be stated in general terms to consist in preparing a compound rubber tube, so made that its interior is strong and tough, while its exterior will be softened by heat, drawing this compound tube into the hose to be lined, and there expanding it, and setting it in place by heat and pressure.

In illustration of the manner in which my invention is, or may be, carried into effect, I will now proceed to describe the method employed by me of lining seamless or woven hose, it being understood that substantially the same method may be pursued in lining any other tubing.

I make a sheet of any suitable rubber compound—for instance, that used for the inside of the ordinary rubber hose—and on one side of this sheet is run a coat of pure gum, or of rubber compounded with white lead, whiting, white oxide of zinc, &c. The thickness of the coat may be varied according to the quality of the goods to be lined. If the goods be very rough, a heavier coat will be more desirable than if the material were comparatively smooth and even. The sheet thus prepared is cut into strips of the required length and width to form the tube.

Care should be taken to make good seams or joints in the tube, all of which is well understood by india-rubber manufacturers.

After the rubber tube is made it is laid in a carriage and run into a heater or vulcanizer and cured, which operation will take about one and a half to two hours, at 250° Fahrenheit, for the ordinary hose-lining compound; but the time and heat vary, of course, according to the compound used. After the tube has been removed from the heater it will be vulcanized sufficiently to give it the necessary strength to enable it to be drawn into the woven hose, and also to prevent its being injured by the steam, or its equivalent, used in expanding and forcing its exterior against the interior of the woven hose, while it will soften under the influence of heat, so that it may be forced into the meshes of, and firmly adhere to, the woven fabric. The tube is now ready to be inserted into the seamless hose, which may be accomplished in the following manner: To one end of the lining-tube is fastened a string, which is passed through the hose by means of a rod or wire. The tube can then be drawn through the hose without difficulty.

A small quantity of pulverulent matter may be rubbed over the outside of the tube, to facilitate the passage of the same into the hose; or the tube may be drawn into the hose by any other suitable means.

After the tube is in the hose a coupling is inserted in each end of the same, and securely fastened thereto. One end of the hose is then secured to a steam-pipe, and the other end to a blow-off pipe, provided with a small valve or drip-cock. All connections being made, steam is let on slowly, to allow the tube to become warm, and to expand into place, which will probably take about five minutes, and the steam may then be let on until it reaches a pressure of from fifty or sixty pounds to the square inch, if the tube be strong enough but varying according to the size and strength of the tube to be lined, and whether it is rough or smooth inside. During the time the steam is turned on the valve or drip cock in the blow-off pipe should be almost shut, or opened just far enough to allow the condensed steam to pass off from the tube which is being lined. Fifteen minutes, under a high pressure, is sufficient for almost any article.

By this process no outside wrappings are required, as is the case when making ordinary rubber hose. The hose will also be clean when finished on account of there being but little handling during the operation of lining, and the work can be done by a few hands, and at little expense.

If desirable, the woven or seamless hose may be coated on the outside with india-rubber. In such case the hose can be submitted to the vulcanizing process previous to the insertion of its lining or afterward—that is to say, the coating on the outside of the hose can be vulcanized either before or after the tube or lining is inserted in its place (preferably after) by laying the hose in a carriage in the usual way.

I am aware of the Patent No. 27,819, dated April 10, 1860, and disclaim the article and the process therein described, the great difference being that the lining-tube used by me is a compound tube—that is, a tube composed of a sheet of the lining compound, with a sheet of the cementing material outside of it, the two sheets making one compound tube—while the lining-tube described in the patent above named is an ordinary tube of vulcanized rubber, wrapped around with rubber-coated cloth, and then covered with rubber cement.

Having now described my invention, and the manner in which the same is or may be carried into effect, what I claim, and desire to secure by Letters Patent, is—

1. The process of lining hose or tubing above described, consisting in first preparing the compound rubber tube with a vulcanized interior and an exterior capable of being softened by heat, next inserting it in the tube to be lined, and, lastly, expanding and heating the lining-tube, so as to soften its exterior and force it into the meshes or pores of the tube to be lined, all substantially as set forth.

2. Hose or tubing made up of a tube of woven fabric or other like material and a prepared compound india-rubber tube united together, substantially as set forth.

3. The process above described for coating hose or tubing with vulcanized rubber, both internally and externally, as and for the purpose set forth.

JAMES B. FORSYTH.

Witnesses:
M. A. KNOX,
J. E. MAYNADIER.